United States Patent
Roth

(10) Patent No.: US 8,522,214 B2
(45) Date of Patent: Aug. 27, 2013

(54) KEYWORD BASED SOFTWARE TESTING SYSTEM AND METHOD

(75) Inventor: Rick R. Roth, Tucson, AZ (US)

(73) Assignee: Open Text S.A., Grand Duchy of Luxembourg (LU)

( * ) Notice: Subject to any disclaimer, the term of this patent is extended or adjusted under 35 U.S.C. 154(b) by 1621 days.

(21) Appl. No.: 11/749,609

(22) Filed: May 16, 2007

(65) Prior Publication Data

US 2008/0010539 A1 Jan. 10, 2008

Related U.S. Application Data

(60) Provisional application No. 60/800,866, filed on May 16, 2006.

(51) Int. Cl.
*G06F 9/44* (2006.01)
*G06F 11/00* (2006.01)

(52) U.S. Cl.
USPC ............................ 717/126; 717/124; 714/38.1

(58) Field of Classification Search
USPC .................. 717/104, 105, 124–135; 714/37, 714/38, 38.1
See application file for complete search history.

(56) References Cited

U.S. PATENT DOCUMENTS

| | | | | |
|---|---|---|---|---|
| 5,754,760 A | * | 5/1998 | Warfield | 714/38 |
| 5,918,037 A | * | 6/1999 | Tremblay et al. | 716/2 |
| 6,694,290 B1 | * | 2/2004 | Apfelbaum et al. | 716/2 |
| 6,944,848 B2 | * | 9/2005 | Hartman et al. | 717/124 |
| 6,978,275 B2 | * | 12/2005 | Castellanos et al. | 1/1 |
| 7,117,484 B2 | * | 10/2006 | Hartman et al. | 717/126 |
| 8,281,286 B2 | * | 10/2012 | Nguyen | 717/125 |
| 2002/0032538 A1 | * | 3/2002 | Lee | 702/119 |
| 2002/0091968 A1 | * | 7/2002 | Moreaux et al. | 714/38 |
| 2003/0014734 A1 | * | 1/2003 | Hartman et al. | 717/125 |
| 2003/0046263 A1 | | 3/2003 | Castellanos et al. | |
| 2003/0196191 A1 | * | 10/2003 | Hartman et al. | 717/126 |
| 2004/0025083 A1 | | 2/2004 | Nanja et al. | |
| 2004/0103396 A1 | * | 5/2004 | Nehab | 717/127 |
| 2004/0128650 A1 | | 7/2004 | Chamberlain | |
| 2007/0234127 A1 | * | 10/2007 | Nguyen | 714/38 |

FOREIGN PATENT DOCUMENTS

WO WO 2007/137082 A3 11/2007

OTHER PUBLICATIONS

Laukkanen, Pekka, "Data-Driven and Keyword-Driven Test Automation Frameworks," Feb. 24, 2006, Helsinki University of Technology, p. 1-98.*

(Continued)

*Primary Examiner* — Qing Chen
(74) *Attorney, Agent, or Firm* — Sprinkle IP Law Group

(57) ABSTRACT

An improved software testing system is described. In various embodiments, the improved software testing system receives a set of keywords identifying logic of a software application that is to be tested, associates each keyword of the set of keywords with a test component that exercises a function of the software application to be tested; derives a model of a behavior of the software application to be tested, and tests the software application based on the keyword and the derived model.

13 Claims, 6 Drawing Sheets

(56) References Cited

OTHER PUBLICATIONS

"Model-Based Testing Home Page," http://www.geocities.com/model_based_testing, May 22, 2004, 1 page.

"Software Testng Analysis & Review (STARWEST 2005) Conference: Tutorials," http://www.sqe.com/Events/Archive/sw2005/tutorials.html, Nov. 14, 2005, 6 pages.

Published International Search Report and Written Opinion for International Patent Application No. PCT/US2007/69062, completed Jun. 5, 2008, mailed Jul. 21, 2008, 9 pgs.

International Preliminary Report on Patentability issued in International Application No. PCT/US07/69062, mailed Oct. 21, 2011, 12 pages.

* cited by examiner

KEYWORD BASED SOFTWARE TESTING SYSTEM AND METHOD

CROSS-REFERENCE TO RELATED APPLICATION(S)

This application claims the benefit of commonly owned U.S. Provisional Patent Application Ser. No. 60/800,866, entitled "Keyword Driven Model Based Testing," filed on May 16, 2006, which is incorporated herein in its entirety by reference.

BACKGROUND

Large software development projects can have multiple phases, including specification, development, and testing. Various software development methodologies include repeating some or all of these phases multiple times, such as in large or complex software development projects. Professional software development teams generally employ testers to test software before it is released to customers. The testers may test software to ensure correctness, completeness, security, and quality. When the tested software does not conform to a tester's expectations, the tester may identify a software defect ("bug"). The tester may provide a sequence of steps so that a software developer can reproduce the defect. The software developer may then resolve the defect, such as by fixing source code and producing a new "build" of the software. It is well known in the art that fixing bugs sometimes introduces other bugs. Thus, testers often perform regression testing, which could involve following the steps previously identified as producing the defect.

Various software testing techniques exist. These techniques can generally be classified as manual testing and automated testing. Manual testing requires a human to perform most of the testing steps. As an example, the human may test the software by either following various scenarios that detail a potential user's interactions with the software or by taking various steps, such as randomly, to identify defects. When performing automated testing, software testers use test automation tools to automatically cause the tested software to take various steps. For example, test automation tools can record a tester's interactions with software as steps and then play back the steps. Some test automation tools employ frameworks that interact with tested software programmatically, such as by using an application program interface (API) provided by the tested software.

Automated testing techniques other than recording and playing back steps can further be divided into keyword-based testing and model-based testing. In keyword-based testing, each discrete interaction with the tested software is assigned a keyword and can have associated parameters. As an example, the process of logging in can be associated with a keyword "login" and have as associated parameters a user identifier and a password. To automatically test software, the software tester may specify one or more keywords, such as in a sequence, so that the test automation tool performs steps relating to each specified keyword. In model-based testing, the software tester specifies (or causes to be specified) a state engine model of the tested software. The state engine model can identify a set of states relating to the tested software and interactions that cause the tested software to move from one state to another. A software tester can then specify a test suite that moves the tested software from, through, or to various states. As an example, the test suite may specify that the tested software is to progress from a "not logged in" state through a "logging in" state to a "logged in" state.

Conventionally, keyword-based testing was thought to be useful for regression testing. On the other hand, model-based testing was thought to be good for discovering software defects.

Figure 1:
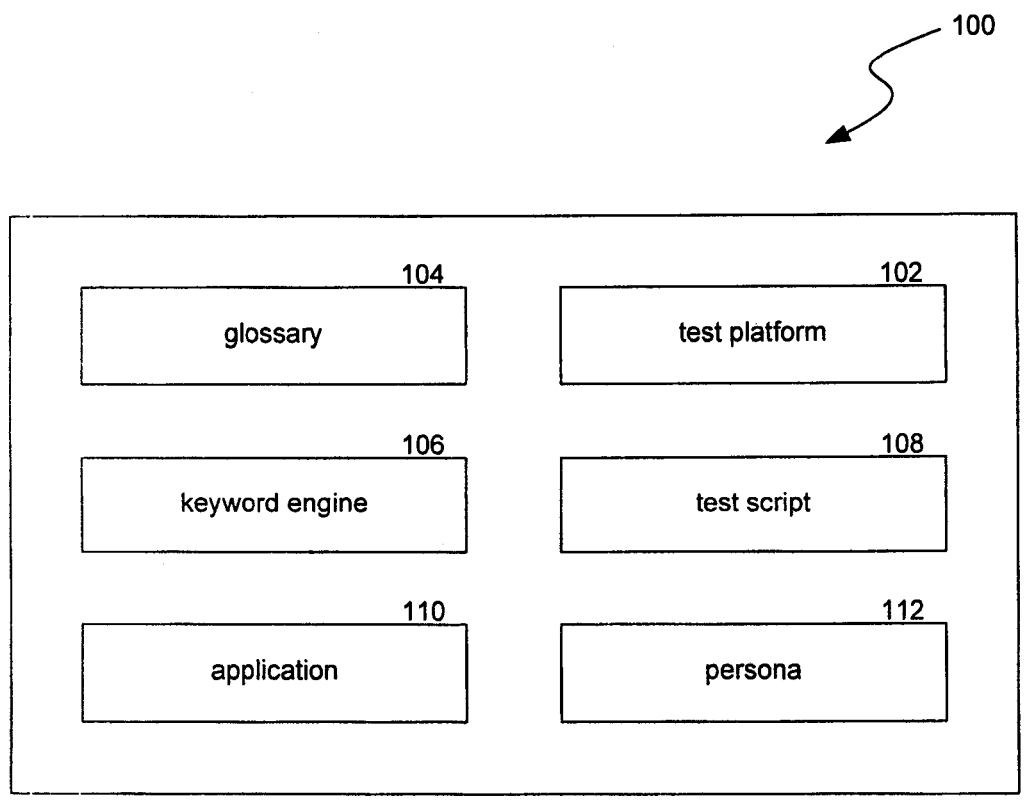
FIG. 1 is a block diagram illustrating components of an improved software testing system in various implementations.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

An improved software testing system is described. In various implementations, the improved software testing system generates a state engine model when a software tester specifies keywords and employs the state engine model to automate testing of software. The specified keywords are stored in a glossary of keywords. As an example, the specified keywords can be stored in an extensible markup language (XML) document. The glossary can contain keywords and parameters or other specification of valid input, such as prior or next states associated with each keyword. The glossary can also contain default values for various parameters. A software tester can then associate one or more keywords with test scripts that can later be selected for automating tests.

The improved software testing system can receive test components from the software tester. As an example, the improved software testing system may provide a wizard interface that enables the software tester to associate keywords with test components. When a test script references a keyword, the improved software testing system can execute associated components and provide parameters identified in the glossary corresponding to the referenced keyword. A test component can be executable logic that is specified in a script language or object code. The test component can interact with software that is to be tested, such as via a testing application or framework. The testing application or framework may interact with the tested software via an API provided by the tested software, an API provided by an underlying operating system, and so forth.

The improved software testing system can employ one or more personas. A persona is an indication of one or more test scripts that are to execute and associated weightings. As an example, a persona can indicate that one test script is to execute 75% of the time and another test script is to execute 25% of the time. When the software tester begins automated testing and selects this persona, the improved software testing system can employ the test scripts at the indicated proportions.

Once the improved software testing system is configured with keywords and test components, a software tester can generate test scripts by specifying keywords or can request the improved software testing system to automatically generate test scripts. The improved software testing system can automatically generate test scripts by causing the tested software to move through the various states identified by the generated state engine model.

The improved software testing system thus can automatically generate "random walk" tests and persona-based or weighted-path tests.

The improved software testing system can also enable syntax checking, transition checking, and automatic generation of parameters during manual specification of test scripts. When a software developer specifies a sequence of keywords, the improved software testing system can verify whether the software developer has provided the appropriate, syntactically correct parameters. If the software developer has not specified syntactically correct parameters, the improved software testing system can warn the software tester or make appropriate corrections. The improved software testing system can verify whether test scripts are appropriately designed to cause the tested software to transition from one state to another. The improved software testing system can verify the state engine model to make this verification. The improved software testing system can automatically generate parameters during manual specification of test scripts by employing the parameters specified in the glossary. The parameters can be values, ranges of values, options selections, and so forth.

Thus, the improved software testing system enables efficient test automation while simultaneously mitigating errors from incorrect input by software testers.

When a test script executes, the improved software testing system can store the steps and the results of the steps, such as in a log file. When a software developer needs to reproduce a defect the test script identifies, the software developer can review the stored steps and results to more easily locate the software code causing the defect.

The improved software testing system will now be described with reference to the Figures. FIG. 1 is a block diagram illustrating components of an improved software testing system in various implementations. The improved software testing system 100 includes a test platform component 102, glossary component 104, keyword engine component 106, test script component 108, application component 110, and persona component 112.

The test platform component 102 can include a test application and other components that facilitate testing software. The test application can be part of a testing platform, such as an application that coordinates other components of the improved software testing system. The test application can employ the glossary component 104 and test script component 108 to execute test scripts. The test platform component can also automatically generate test scripts, such as based on the state engine model.

Figure 2:
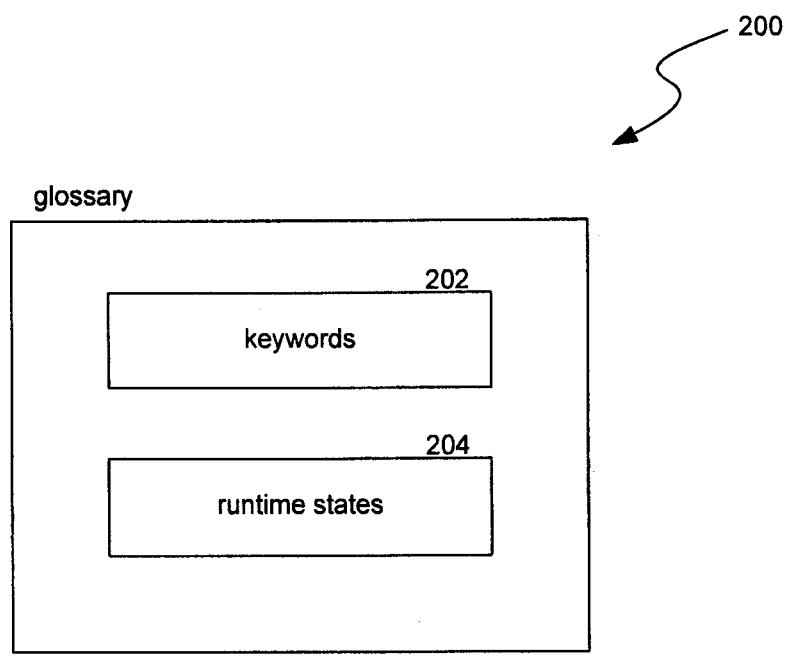
FIG. 2 is a block diagram illustrating additional components of an improved software testing system in various implementations.

The glossary component 104 can be a document, file, or other repository of information associated with software that is to be tested. As is illustrated in FIG. 2, a glossary 200 can include keywords 202 and runtime states 204. Keywords are commands or sets of commands that the improved software testing system can execute when executing a test script. Runtime states are states of the software that is to be tested. The runtime states can include start states and end states relating to a keyword. The glossary can also include parameters (e.g., values associated with a command of the tested software), parameter default values, weights, and so forth. The weights can specify how often a corresponding keyword is to be employed, such as by a test script.

When the glossary indicates that a particular keyword requires parameters, the test application can prompt the software tester for values or can generate values for the parameters.

Returning to FIG. 1, the keyword engine component 106 can employ keywords from the glossary and identify test components that a software developer has provided corresponding to the keywords. The test components can cause the tested software to invoke a command, such as by employing an API provided by the tested software or operating system.

One or more test scripts can identify a sequence of steps, such as by identifying keywords from the glossary. The test scripts can be created manually or automatically. As an example, a software tester can create a test script by specifying one or more keywords. Alternatively, the test application can automatically create test scripts.

The application component 110 is a software application that is to be tested. The improved software testing system can test various applications.

The improved software testing system can function with one or more persona components 112. The persona can identify the type of testing, duration, the test scripts to execute, weights for the test scripts, and so forth.

The computing devices on which the improved software testing system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the improved software testing system. In addition, the data structures and message structures may be stored or transmitted via a data transmission medium, such as a signal on a communications link. Various communications links may be employed, such as the Internet, a local area network, a wide area network, or a point-to-point dial-up connection.

The improved software testing system may use various computing systems or devices, including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The improved software testing system may also provide its services to various computing systems, such as personal computers, cell phones, personal digital assistants, consumer electronics, home automation devices, and so on.

The improved software testing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
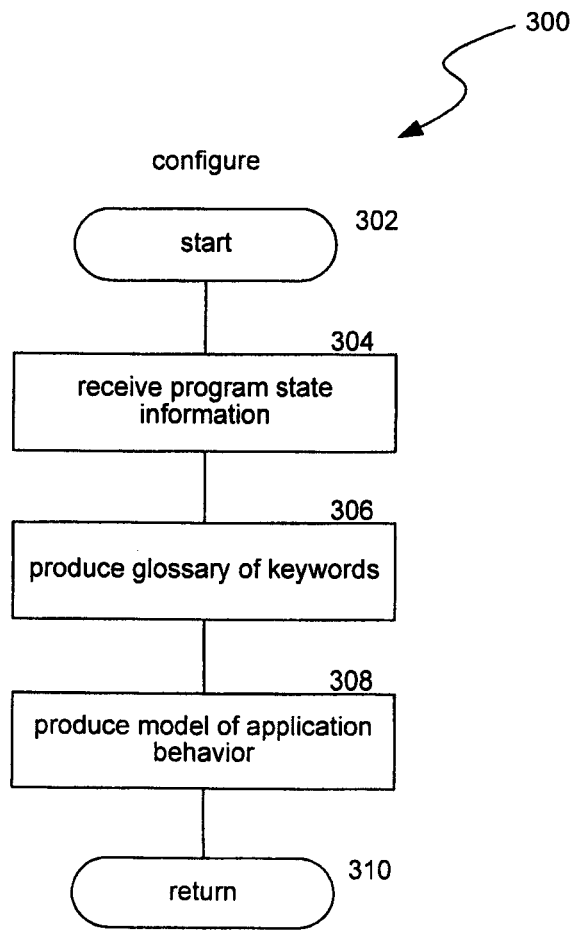
FIG. 3 is a flow diagram illustrating a configure routine invoked by the improved software testing system in some implementations.

Turning now to FIG. 3, a flow diagram is illustrated describing a configure routine invoked by the improved software testing system in some implementations. The routine 300 is invoked to configure the improved software testing system. The routine begins at block 302. At block 304, the routine receives program state information, such as state information associated with the software that is to be tested. The improved software testing system can employ the program state information to derive a state engine model for the software to be tested. At block 306, the routine produces a glossary of keywords. The routine can produce the glossary of keywords by generating keywords from the received program state information. Alternatively, the routine may receive the keywords from a user. The glossary can include other information associated with the keywords, such as parameters. At block 308, the routine produces a model of the application's (e.g., software's) behavior. At block 310, the routine returns.

Figure 4:
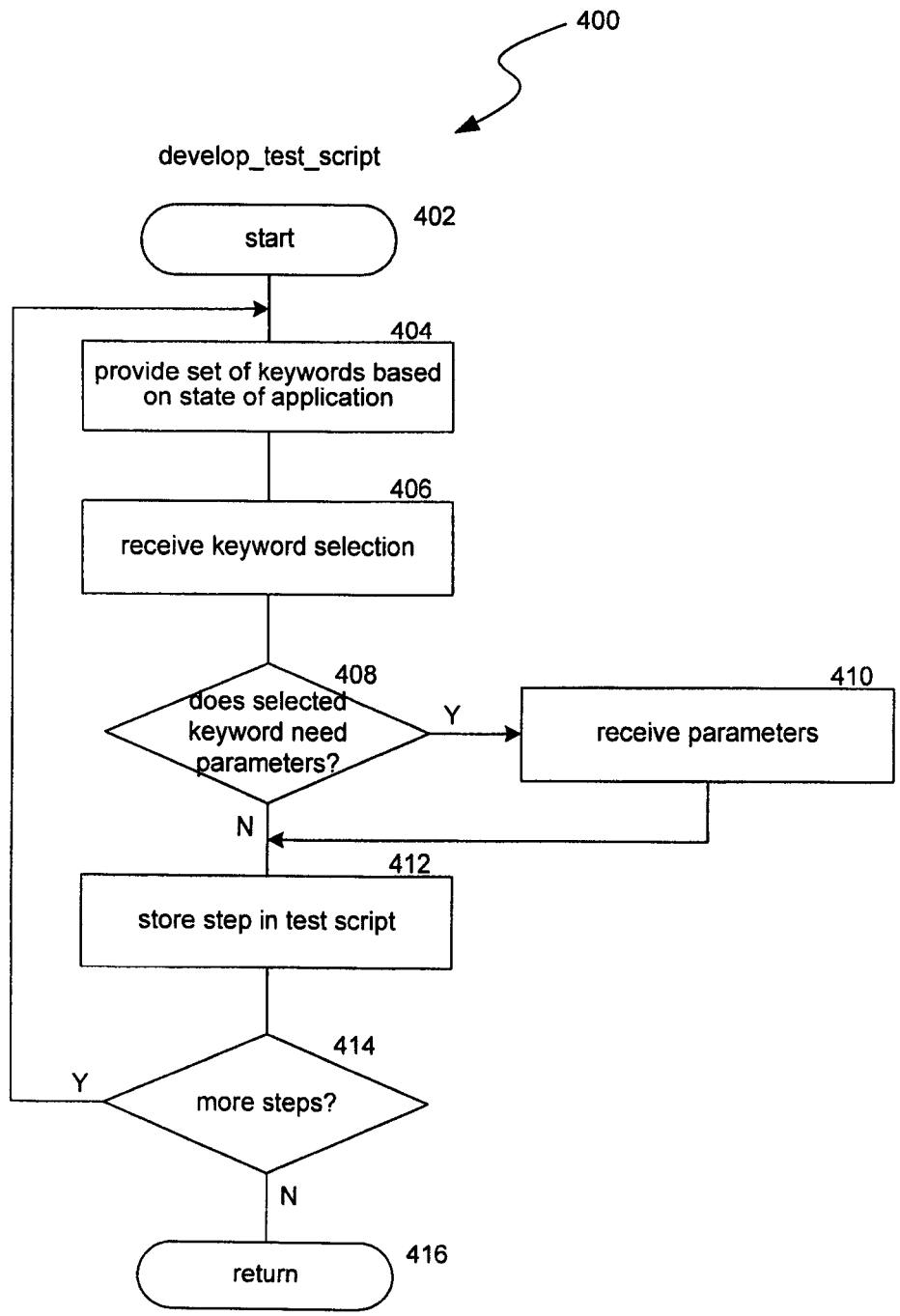
FIG. 4 is a flow diagram illustrating a develop_test_script routine invoked by the improved software testing system in some implementations.

FIG. 4 is a flow diagram illustrating a develop_test_script routine invoked by the improved software testing system in some implementations. The routine 400 is invoked to develop a test script, such as under the direction of a software tester. The routine begins at block 402. At block 404, the routine provides a set of keywords based on the current state of the software to be tested. When the routine is first invoked, the routine may assume that the software is in a "not running" state. The routine may retrieve this information from the glossary and provide it to the user in a user interface. At block 406, the routine receives a keyword selection from the user. At decision block 408, the routine determines whether the selected keyword needs parameters. If that is the case, the routine receives parameters at block 410. In various implementations, the improved software testing system can generate parameters automatically or may prompt a user for the parameters. After receiving the parameters, the routine continues at block 412. If the selected keyword needs no parameters, the routine also continues at block 412. At decision block 414, the routine determines whether there are any more steps. The routine may make this determination by asking the user whether any more steps need to be added to the test script. Alternatively, when the routine determines that the software's state is finished, the routine may determine that there are no more steps. If there are more steps, the routine continues at block 404. Otherwise, the routine continues at block 416, where it returns.

Figure 5:
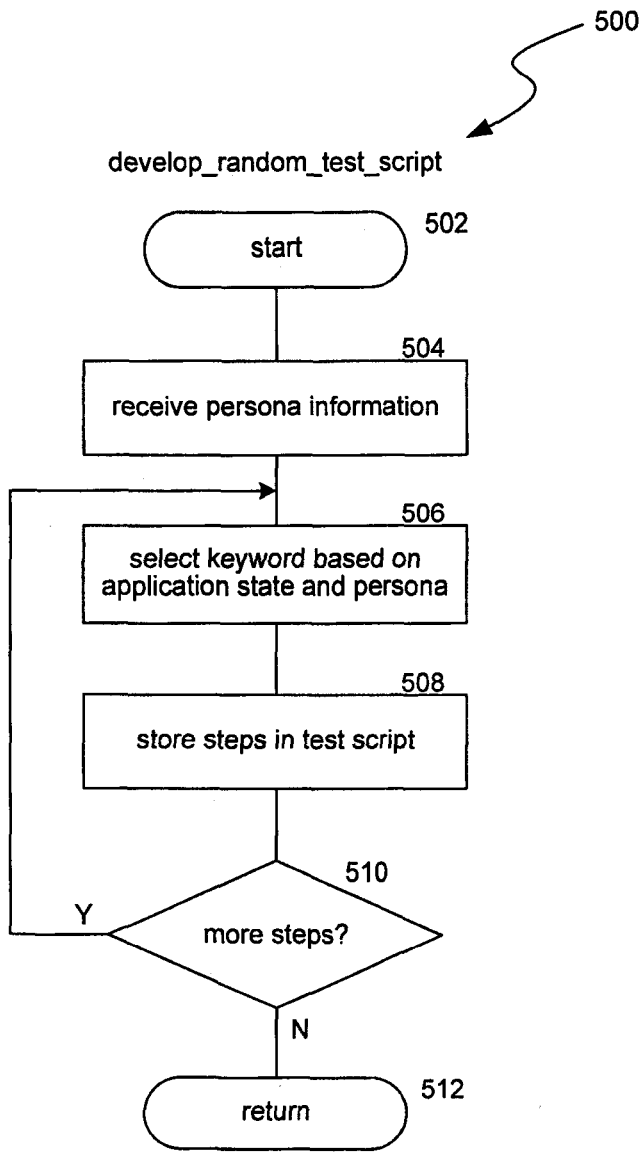
FIG. 5 is a flow diagram illustrating a develop_random_test_script routine invoked by the improved software testing system in some implementations.

FIG. 5 is a flow diagram illustrating a develop_random_test_script routine invoked by the improved software testing system in some implementations. The routine 500 is invoked to develop a test script automatically. The routine begins at block 502. At block 504, the routine can receive persona information. Alternatively, the routine may derive this information from the glossary. The routine employs this information to determine which keywords should be added to the test script. As an example, keywords with a greater weight may be added to the test script with higher frequency than other keywords with a lower weight. At block 506, the routine selects a keyword based on the software's current state and the persona information. At block 508, the routine stores steps relating to the selected keyword in the test script. As an example, the routine may identify test components associated with the selected keyword. At decision block 510, the routine determines whether more steps are needed. The routine may make this determination randomly or may determine that additional steps are required based on the state of the software after performing the previous step. If more steps are required, the routine continues at block 506. Otherwise, the routine continues at block 512, where it returns.

Figure 6:
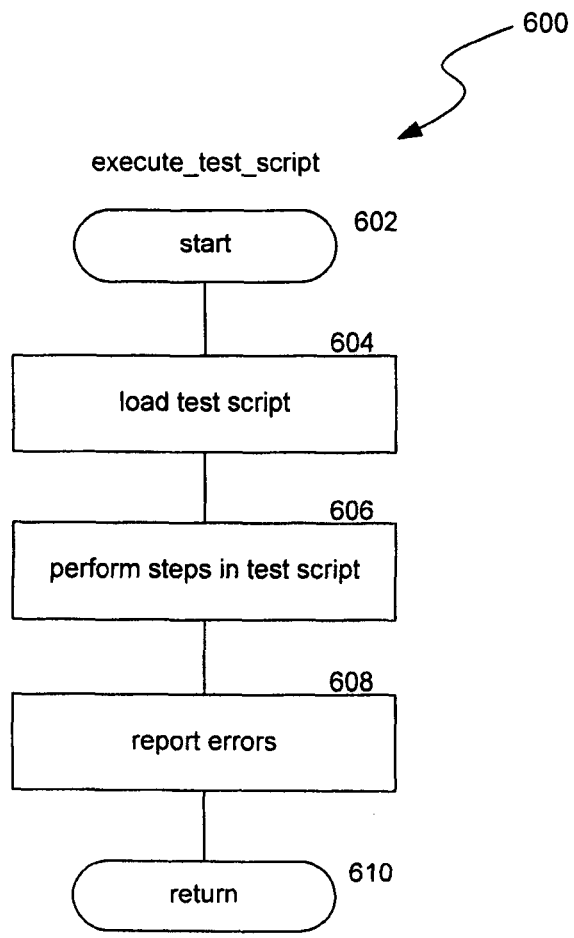
FIG. 6 is a flow diagram illustrating an execute_test_script routine invoked by the improved software testing system in some implementations.

FIG. 6 is a flow diagram illustrating an execute_test_script routine invoked by the improved software testing system in some implementations. The improved software testing system can invoke the routine 600 to execute a test script. The routine begins at block 602. At block 604, the routine loads the test script. The test script can be identified by a software tester or can be identified randomly, such as based on a selected persona. At block 606, the routine performs steps indicated in the test script. As an example, the routine may load test components that are indicated by keywords identified in the test script. At block 608, the routine may report errors. As an example, if the test script could not execute or caused errors in the software, the routine may log such errors. Later, when a software developer wants to determine why the software could not execute, the software developer can review the log. The log may contain a list of keywords or steps that were executed. The routine returns at block 610.

Conclusion

Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the improved software testing system is not intended to be exhaustive or to limit the improved software testing system to the precise form disclosed above. While specific embodiments of, and examples for, the improved software testing system are described above for illustrative purposes, various equivalent modifications are possible within the scope of the improved software testing system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the improved software testing system provided herein can be applied to other systems, not necessarily the system described herein. The elements and acts of the various embodiments described above can be combined to provide further embodiments.

These and other changes can be made to the improved software testing system in light of the above Detailed Description. While the above description details certain embodiments of the improved software testing system and describes the best mode contemplated, no matter how detailed the above appears in text, the improved software testing system can be practiced in many ways. As noted above, particular terminology used when describing certain features or aspects of the improved software testing system should not be taken to imply that the terminology is being redefined herein to be restricted to any specific characteristics, features, or aspects of the improved software testing system with which that terminology is associated. In general, the terms used in the following claims should not be construed to limit the improved software testing system to the specific embodiments disclosed in the specification, unless the above Detailed Description section explicitly defines such terms. Accordingly, the actual scope of the improved software testing system encompasses not only the disclosed embodiments, but also all equivalent ways of practicing or implementing the improved software testing system under the claims.

While certain aspects of the improved software testing system are presented below in certain claim forms, the inventors contemplate the various aspects of the improved software testing system in any number of claim forms. For example, while only one aspect of the improved software testing system is recited as embodied in a computer-readable medium, other aspects may likewise be embodied in a computer-readable medium. Accordingly, the inventors reserve the right to add additional claims after filing the application to pursue such additional claim forms for other aspects of the improved software testing system.

I claim:

1. A system for testing software, comprising:
   a test platform having hardware and software that test a software application;
   a glossary component containing information associated with the software application, wherein the information associated with the software application includes keywords and a first desired state and a second desired state of the software application associated with each of the keywords, and wherein a model of the software application's behavior is derived utilizing the first and second desired states of the software application; and
   a test script referencing one or more of the keywords from the glossary component,
   wherein the software of the test platform comprises instructions translatable by the hardware of the test platform to perform:
      retrieving the test script,
      identifying a keyword referenced by the test script,
      performing a step in the test script relating to the identified keyword, wherein performing the step causes the software application to move from a first state to a second state, and
      verifying, via the model of the software application's behavior, whether the first and second states correspond to the first and second desired states of the software application.

2. The system of claim 1, further comprising:
   a persona identifying an indication of how frequently the test script is to be executed.

3. The system of claim 1, further comprising:
   a keyword engine that associates keywords with test components, wherein the test components contain instructions for causing the software application to move from the first state to the second state.

4. A method for testing software, comprising:
   at a software testing system running on one or more computing devices, receiving program state information containing a first program state and a second program state, wherein the first and second program states are associated with a software application;
   identifying a keyword that causes the software application to move from the first program state to the second program state;
   storing the keyword in a glossary, wherein the glossary contains information associated with the software application, and wherein the information associated with the software application includes keywords and program states associated with each of the keywords;
   producing a model of the software application's behavior, wherein the model of the software application's behavior specifies the first and second program states;
   verifying, via the model of the software application's behavior, whether an action corresponding to the keyword causes the software application to move from the first program state to the second program state;
   automatically generating a test script based on the keyword and the model of the software application's behavior; and
   executing the generated test script.

5. The method of claim 4, further comprising:
   selecting a keyword based on a weight specified in the glossary.

6. The method of claim 4, further comprising:
   providing a set of keywords based on a current expected state of the software application;
   receiving a keyword selection; and
   storing a step in the generated test script corresponding to the received keyword selection.

7. The method of claim 4, further comprising:
   providing a set of keywords based on a current expected state of the software application;
   receiving a keyword selection;
   determining whether the selected keyword requires a parameter;
   receiving the parameter; and
   storing a step in the generated test script corresponding to the received keyword selection, wherein the step that is stored in the generated test script specifies the parameter required by the selected keyword.

8. The method of claim 4, further comprising:
   providing a set of keywords based on a current expected state of the software application;
   receiving a keyword selection;
   storing a step in the generated test script corresponding to the received keyword selection; and
   logging the step and a result of the step in a log.

9. The method of claim 4, further comprising:
   providing a set of keywords based on a current expected state of the software application;
   receiving a keyword selection;
   determining whether the selected keyword requires a parameter;
   receiving the parameter;
   storing a step in the generated test script corresponding to the received keyword selection, wherein the step that is stored in the generated test script specifies the parameter required by the selected keyword; and
   logging the step and a result of the step in a log.

10. A non-transitory computer-readable medium storing computer-executable instructions that, when executed, cause a computer system to perform a method for testing software, the method comprising:
    at the computer system, receiving a set of keywords identifying logic of a software application;
    storing the set of keywords in a glossary, wherein the glossary contains information associated with the software application, and wherein the information associated with the software application includes the set of keywords and start states and end states associated with each keyword of the set of keywords;

associating each keyword of the set of keywords with a test component that exercises a function of the software application;

deriving a model of a behavior of the software application, wherein the model of the behavior of the software application indicates, for each keyword of the set of keywords, a start state and an end state of the software application;

verifying, via the derived model of the behavior of the software application, whether an action corresponding to one or more keywords of the set of keywords causes the software application to move from the start state to the end state;

generating a test script based on the derived model of the behavior of the software application; and executing the generated test script.

11. The non-transitory computer-readable medium of claim 10, wherein the method further comprises:

executing the generated test script in a specified frequency.

12. The non-transitory computer-readable medium of claim 10, wherein the method further comprises:

generating at least two test scripts based on the derived model of the behavior of the software application;

randomly selecting one of the at least two generated test scripts; and executing the randomly selected one of the at least two generated test scripts.

13. The non-transitory computer-readable medium of claim 10, wherein the method further comprises:

generating at least two test scripts based on the derived model of the behavior of the software application;

randomly selecting one of the at least two generated test scripts using a specified frequency; and executing the randomly selected one of the at least two generated test scripts.

* * * * *

UNITED STATES PATENT AND TRADEMARK OFFICE
CERTIFICATE OF CORRECTION

| | | |
|---|---|---|
| PATENT NO. | : 8,522,214 B2 | Page 1 of 1 |
| APPLICATION NO. | : 11/749609 | |
| DATED | : August 27, 2013 | |
| INVENTOR(S) | : Roth | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1415 days.

Signed and Sealed this
Twenty-seventh Day of January, 2015

Michelle K. Lee
*Deputy Director of the United States Patent and Trademark Office*